United States Patent [19]
Schabowski

[11] Patent Number: 4,811,202
[45] Date of Patent: Mar. 7, 1989

[54] QUADRUPLY EXTENDED TIME MULTIPLEXED INFORMATION BUS FOR REDUCING THE 'PIN OUT' CONFIGURATION OF A SEMICONDUCTOR CHIP PACKAGE

[75] Inventor: John Schabowski, Houston, Tex.

[73] Assignee: Texas Instruments Incorporated, Dallas, Tex.

[21] Appl. No.: 307,415

[22] Filed: Oct. 1, 1981

[51] Int. Cl.[4] .............................................. G06F 1/00
[52] U.S. Cl. ................................................. 364/200
[58] Field of Search ... 364/200 MS File, 900 MS File

[56] References Cited

U.S. PATENT DOCUMENTS

| 3,972,028 | 7/1976 | Weber | 364/200 |
|---|---|---|---|
| 4,016,545 | 4/1977 | Lipovski et al. | 364/900 |
| 4,045,782 | 8/1977 | Anderson | 364/200 |
| 4,047,245 | 9/1977 | Knipper | 364/200 |
| 4,112,490 | 9/1978 | Pohlman | 364/200 |
| 4,152,762 | 5/1979 | Bird | 364/200 |
| 4,171,538 | 10/1979 | Sheller | 364/900 |
| 4,224,668 | 9/1980 | Peters | 364/200 |
| 4,286,321 | 8/1981 | Baker et al. | 364/200 |

OTHER PUBLICATIONS

Brown et al., "Instructions for Byte Addressing Capability", IBM Tech. Dis. Bull., vol. 16, No. 3, Aug. 1973, pp. 812-815.

Primary Examiner—Raulfe B. Zache
Attorney, Agent, or Firm—Melvin Sharp; Richard L. Donaldson; Thomas W. DeMond

[57] ABSTRACT

A digital processor system includes a processor, a memory and a memory interface between the processor and the memory. The memory stores data in one bit format but addresses the data in a second bit format. The interface to the memory includes a controller that is responsive to the processor, an information bus for the transfer of addresses and data and two registers to store addresses for the memory. These registers in the interface are responsive to the processor through the interface controls in order to allow the processor to increment or decrement the memory addresses or load new memory addresses from the information bus. These registers are then connected to a switch which is in turn responsive to the processor through the interface control in order that the processor can determine which register is to provide the address to the memory.

5 Claims, 8 Drawing Sheets

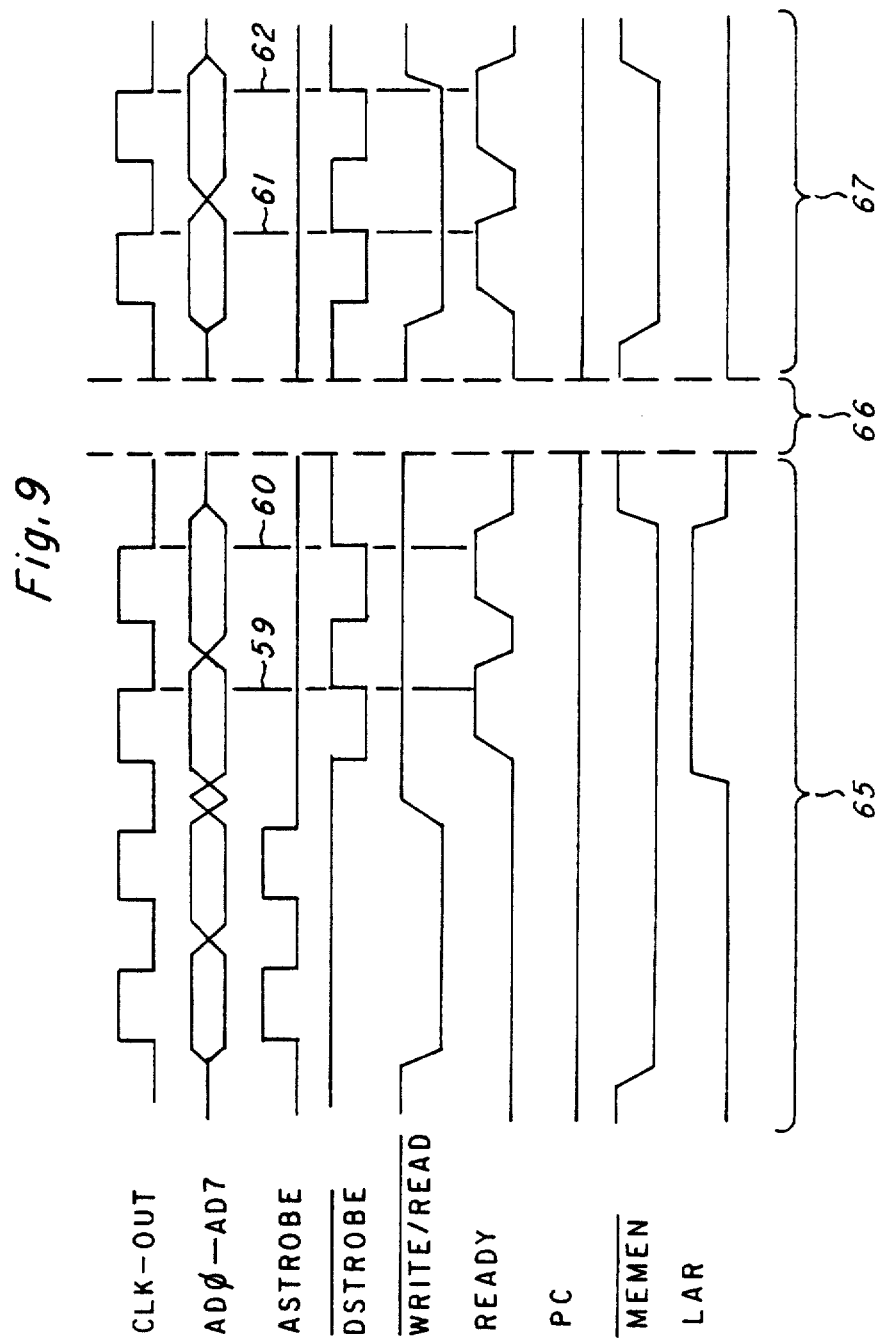

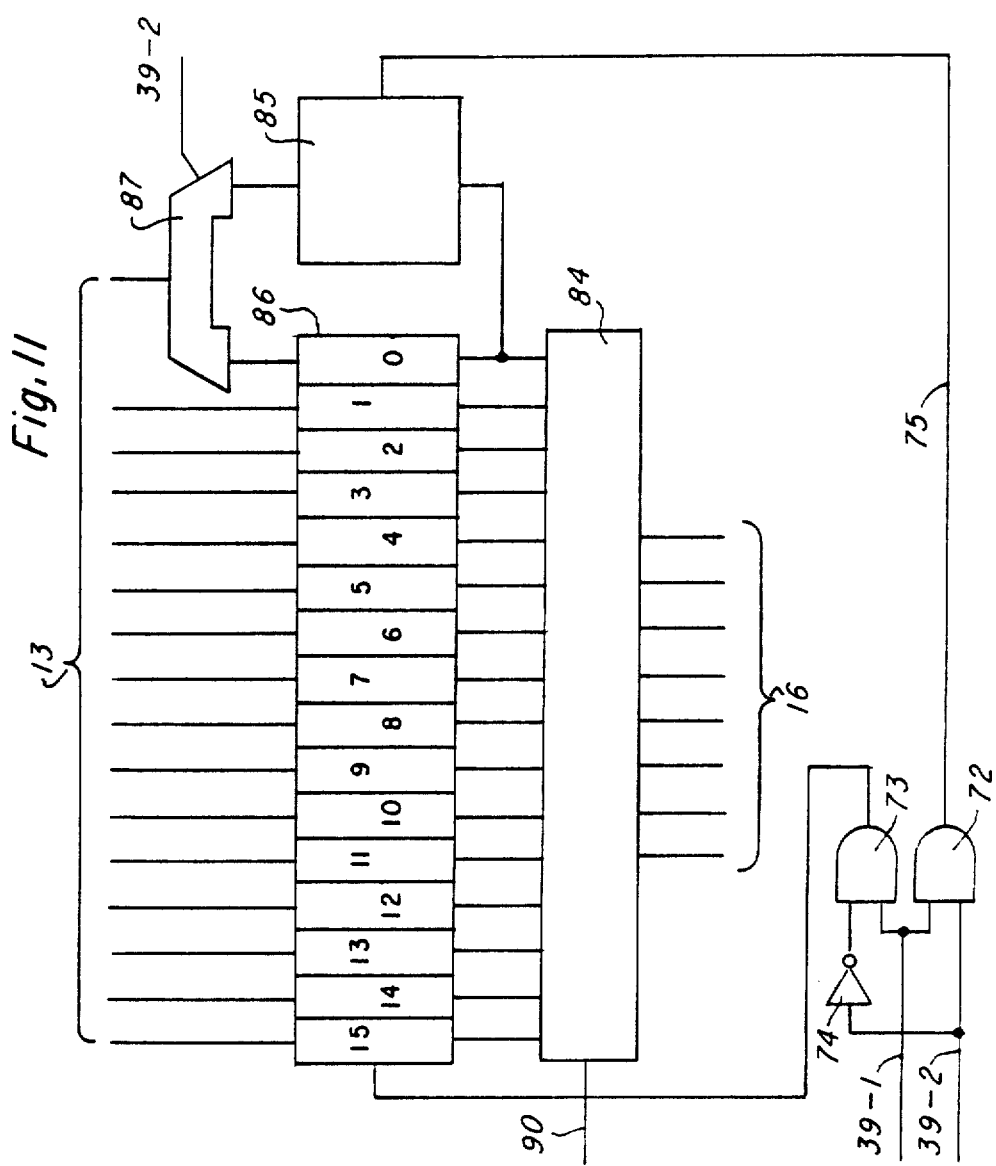

QUADRUPLY EXTENDED TIME MULTIPLEXED INFORMATION BUS FOR REDUCING THE 'PIN OUT' CONFIGURATION OF A SEMICONDUCTOR CHIP PACKAGE

CROSS REFERENCE TO RELATED APPLICATIONS

This application is in the same subject area as Ser. No. 279,878, and Ser. No. 279,881, all assigned to Texas Instruments.

BACKGROUND OF THE INVENTION

1. Field of the Invention

This invention relates to data transfer between data processing systems and external peripheral devices, digital processing systems in general and computer systems.

2. Description of the Prior Art

Digital processors communicate with the external world through many means, such as interrupts, direct memory access (DMA) and programmed input/output (I/O) ports. For digital processors contained on a single chip or semiconductor substrate, the interface to the external world becomes more difficult because of the limited number of pins available on the chip package for this interface. Many schemes have been used to circumvent the problem of limited pins. One technique is to use the same I/O lines for both data and address. An extension of the technique is to use only 8 lines for 16 bits of data and 16 bits of address information. The 16 bit information is divided into two parts of 8 bit bytes. The most significant byte, the 8 bits contained in the upper part of 16 bit words, are normally transmitted first followed by the least significant byte, the 8 bits in the least significant portion of the 16 bit word. For a 16 bit memory access then, the sequence is to send first the most significant 8 bits of the address followed by the least eight significant bits of the address. Then on the same bus the data would be sent by/sending the first most significant 8 bits of the data then the least significant 8 bits. While this technique solves the problem of memory access with a limited number of pins in the interface, it does so in a manner that requires more time than is required for a single 16 bit transmission over 16 parallel data lines. Thus the first technique requires four cycles whereas the second technique requires only two. The first technique is therefore referred to as "quadruply time-multiplexing".

SUMMARY OF THE INVENTION

In accordance with the present invention, a digital processor system is provided which includes a processor, an external memory, and an interface to the external memory. The interface includes control capability response to signals from the processor, an information bus to transfer information between the processor and the external memory and memory addressing capability to provide memory addresses to the external memory to designate which data contained in the external memory is to be transferred to the processor over the information bus. The memory interface further includes two registers which both contain addresses for data and memory. These registers are responsive to control signals from the processor to increment or decrement the register contents or load a register from the information bus. These registers are in turn connected to a switch that selects one of the two registers in response to control signals from the processor. The output of this switch is connected to the memory.

In one embodiment of this invention, an external memory interface is provided which stores addresses in two registers. The interface is connected to the address port of the external memory. The registers are connected to a switch which is connected to this external memory address port. The switch determines which of the registers is to provide the address to the external memory. One register contains the program counter for the program that is currently in execution. The second register contains the general data address. The interface further consists of control signals from the processor that include an ADDRESS signal, a READ/WRITE signal and a MEMORY ENABLE signal and a LOAD ADDRESS REGISTER signal. The interface provides a signal to the processor from the memory which is called the READY signal. The ADDRESS STROBE signal causes the information over the information bus to be loaded into either the program control register or the address register. The actual loading of either register is determined by the PC or PROGRAM COUNTER signal. The address register contains the standard 16 bit register with the least significant bit coupled to a switch for the two bit position. A second input for the switch is connected to a flip-flop whose input is also connected to the least significant bit position of the information bus input. The register operates such that when the address is loaded from the information bus, both the least significant bit position in the register and the flip-flop are set to the same value. Data is then read from memory when the interface receives a data strobe signal from the processor. Upon the occurrence of the second data strobe signal during normal operation, the address register is incremented. However, when it is desirable to leave the address in the address register unchanged upon the occurrence of the second data strobe signal, and the LOAD ADDRESS REGISTER (LAR) signal, the flip-flop is toggled and the resulting address is the most significant 15 bits of the register and the contents of the flip flop which is indicative of an incremented address. When the same address location in memory must be addressed by the processor, then the processor uses the address that is existing in the address register. This capability makes it unnecessary to load 16 bits of address over the information bus, thus saving two information bus transfers for a successive addressing operation. Therefore, instructions in the processor that require access to external memory may obtain data from and store data strobe signal, the contents of the load of the address register is then incremented so that upon occurrence of the second data strobe signal, the next sequential location in the external memory is addressed. Therefore, instructions in the processor that require access to external memory may obtain data from and store data to the external memory without repetitively transmitting the addresses over the information bus.

BRIEF DESCRIPTION OF THE DRAWINGS

FIG. 9 is a timing diagram that illustrates the addressing capability made possible by this invention to increment and decrement the address register during instruction execution in the processor.

FIG. 11 is a logic diagram of the address register 9 in the external memory interface.

DESCRIPTION OF THE INVENTION

Figure 1:
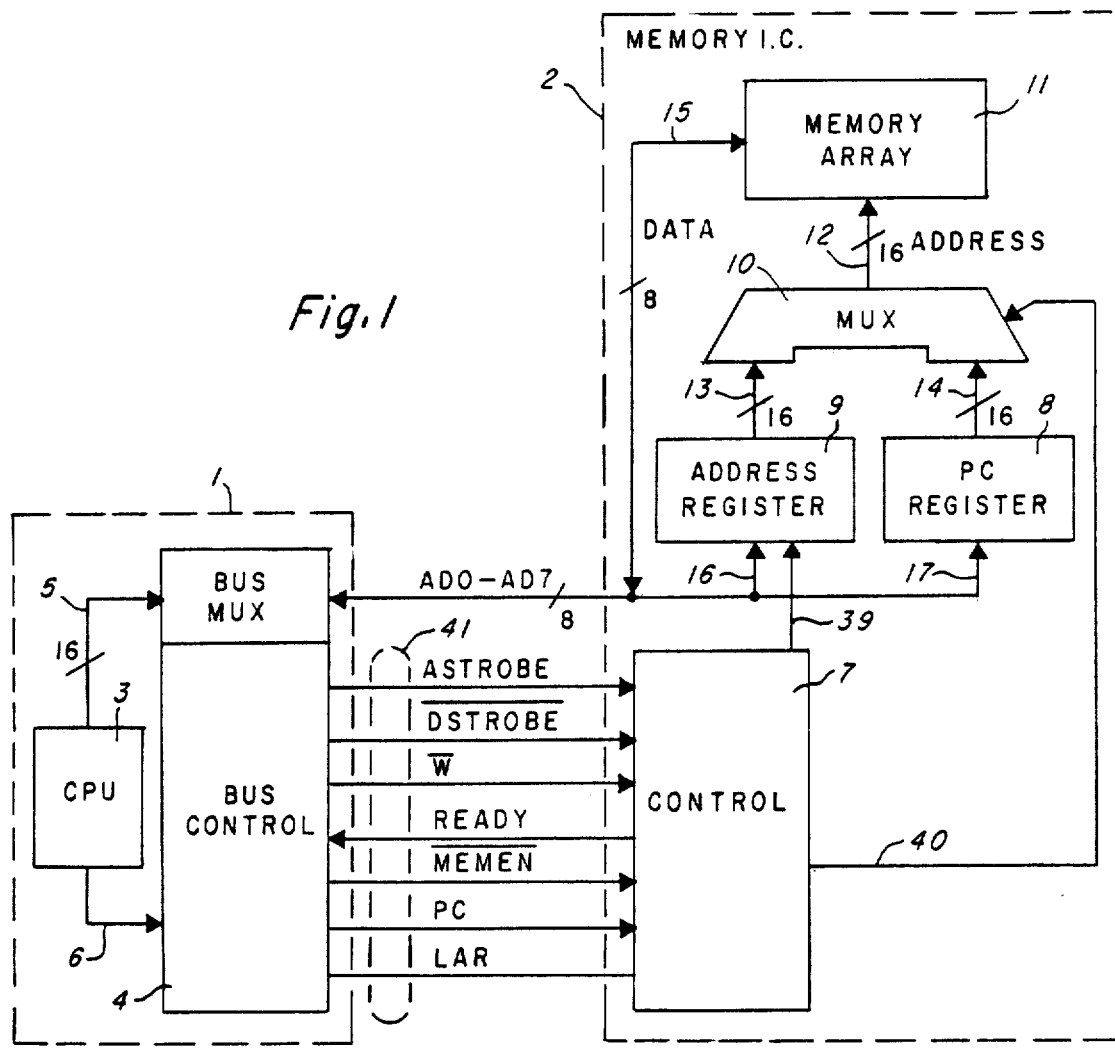
FIG. 1 is a block diagram illustrating a processing unit interface to an external memory.

FIG. 1 illustrates a configuration consisting of a processor 1 connected to an external memory 2. In the processor 1, a central processing unit, CPU 3, is connected to a multiplex information bus interface unit 4 consisting of the Quad mux bus controller and the bus control. The bus multiplexer portion of the interface 4 is connected to the central processing unit through 16 data lines 5. The data lines 5 are used to transmit data and receive data from the external information bus AD-0 through AD-7. The bus control portion of the Quad Mux controller 4 connects to 7 control lines 41 as shown. The bus controller in turn receives inputs from the CPU 3 via line 6. The external memory 2 contains a memory array 11 which stores data and instruction codes to be accessed by the processor 1. These data and instruction codes are stored in 8 bit bytes individually accessed by 16 bit word addresses. In addition, the external memory 2 contains the control 7 which interfaces through the control lines from the bus control circuitry contained in the 1 Quad Mux bus controller 4. The information bus AD-0 to AD-7 is connected to an address register 9 via line 16 and to a program program counter, PC, register 8 via line 17. The address register 9 loads data addresses in order that data is to be accessed in the memory array 11. Likewise the progam counter register 8 is loaded with the program count in order to address instruction codes contained in the memory array 11. Both the address register 9 and program counter register 8 are 16 bit registers. The selection of the address register 9 or the program counter register 8 is accomplished by a multiplexer 10 which receives inputs from the address register 9 over lines 13 or the address from the program counter register 8 over lines 14. The output of the multiplexer 10 is then connected to the memory array 11 over lines 12. The contents over line 12 is the address of the data that is being referenced in the memory array 11. The contents of the memory cells being addressed are then placed on the data lines 15 to be placed on the information bus AD-0 to AD-7 for access by the processor 1.

Figure 2:
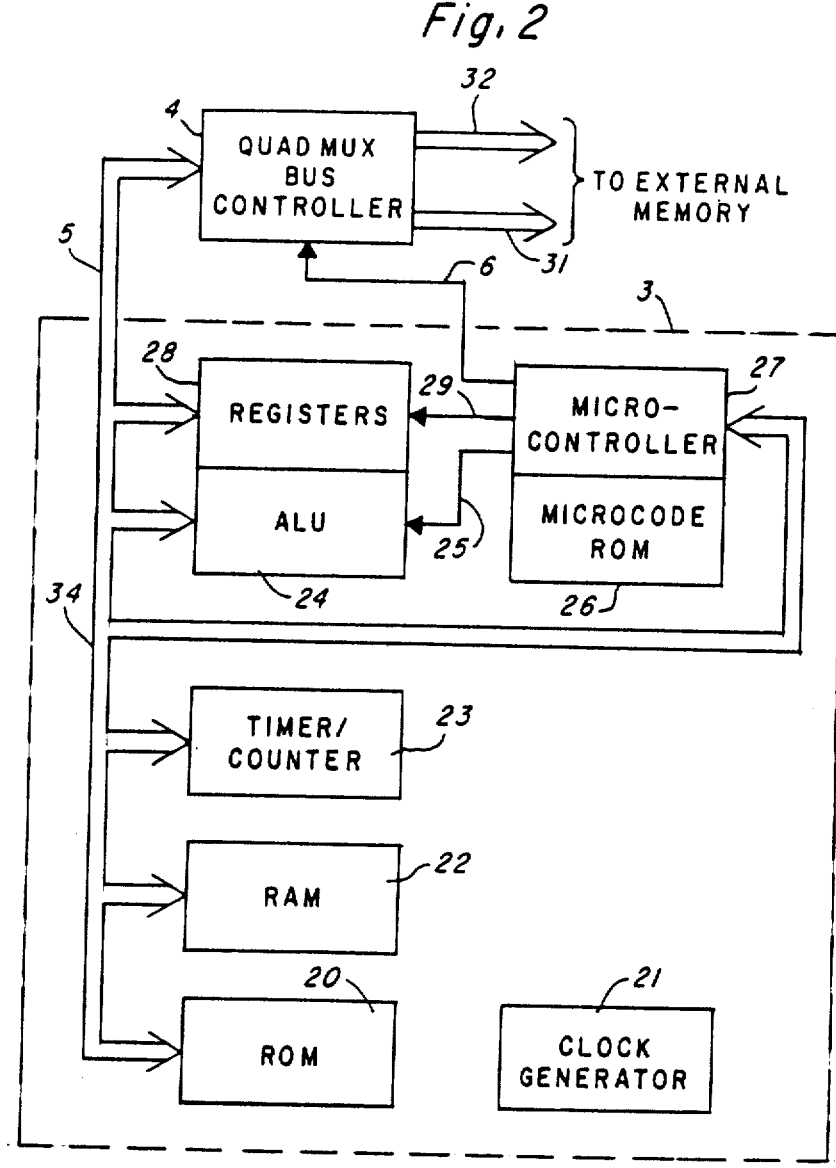
FIG. 2 is a block diagram of the processing unit.

This invention enables a processing unit to access the memory array 11 by loading the address over the information bus AD-0 to AD-7 via line 16 or by using the address already in the address register or by altering the contents of address register 9 via line 39. The embodiment of this invention can be more easily understood by examining both the contents of the processor 1 and the external memory 2. Referring to FIG. 2, the processor 1 is illustrated. The CPU 3 is shown to contain a register set 28 connected to an arithmetic logic unit ALU, 24 together connected to a data bus which is in turn connected to the microcontroller 27 and microcode ROM 26. In addition, a timer/counter 23 RAM 22 and a ROM 20 are also connected to the data bus 34. The CPU 3 operates by taking data from the data bus 34, loading it into the registers 28 and performing operations upon the data in the ALU 24 under the control of the microcontroller 27. The microcontroller 27 controls the registers via line 29 and also the ALU 24 via line 25. The microcontroller receives its instructions from the microcode ROM 26 which is addressed by the instruction over the data bus line 34. In addition the central processing unit 3 contains a timer/counter is used to count even or time events during the execution of instructions in the processor. RAM 22 is supplied for temporary storage of data. The ROM 20 is supplied for the storage of instructions within the CPU 3. In addition a clock generator 21 provides to supply the internal clocking for the CPU 3. CPU 3 is connected to the external memory through the Quad MUX bus controller 4. The Quad Mux bus controller circuitry 4 is connected to the data bus 34 via line 5 which carry the 16 bits into the Quad Mux bus controller. The Quad Mux bus controller also receives an input from the microcontroller 27 over line 6. The output of the Quad Mux bus controller 4 to the external memory is via lines 32 which are the information bus AD-0 to AD-7 and the control lines 31. During the execution of different instructions, the microcontroller 27 may command the Quad-Mux bus controller 4 over line 6 to alter the address in the address register 9 contained in external memory 2 (see FIG. 1), leave the contents of the address register 9 the same or to load a new address into this address register 9 via the lines 32 through the information bus AD-0 to AD-7.

Figure 3:
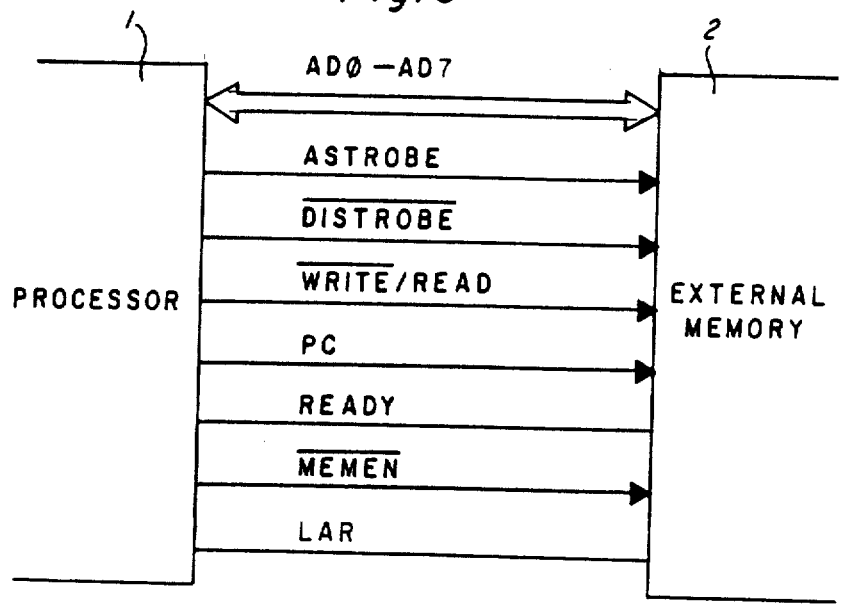
FIG. 3 is a diagram that illustrates the signal lines between the processing unit and the external memory interface.

Referring to FIG. 3, the information bus is illustrated as AD-0 to AD-7 which is provided to transfer both addresses and data between the external memory 2 and processor 2. This information bus is bidirectional. Located below the information bus AD-0 to AD-7 and 7 control lines. The top control line is address strobe (ASTROBE) and is high when an address is being placed on the information bus AD-0 to AD-7 by the processor 1. Data strobe-($\overline{DSTROBE}$-) is active low and is active when data is placed on the address information bus AD-0 to AD-7 by either the processor 1 or external memory 2. The next control signal is the WRITE-/READ line which signifies whether data is being written to or read from memory or whether addresses are being written to or read from the address registers or PC register. The next control line is PC which signifies the access to Program Counter Register 8 in order to load the program counter contents into the memory address to access an instruction contained in the memory array 11. The READY control line is the only line originating from external memory 2 and is used to designate the completion of the access to the external memory 2. The memory enable line $\overline{MEMEN}$- is active low line which designates when a memory access is being attempted. The LAR line is used to load the address register such that the address register contents may be decremented during the next memory access.

Figure 4:
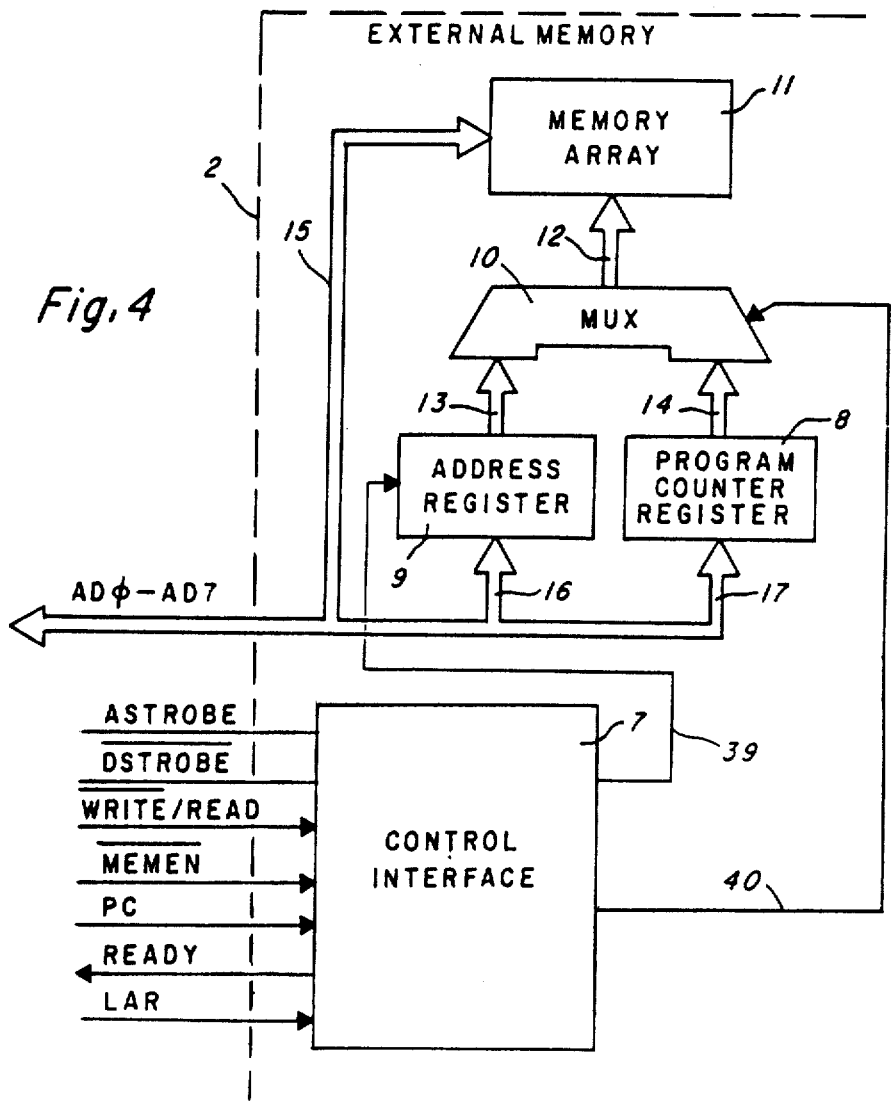
FIG. 4 is a block diagram of the external memory interface showing the connection to the processing unit.

FIG. 4 illustrates the contents of the external memory 2 and its interface to the processor 1. The external information bus AD-0 to AD-7 is the input to the external memory 2 and is connected to the memory array 11 and address register 9 through line 16 and program counter register 8 through lines 17. The address register 9 is controlled by lines 39 which alter the address register in response to the ASTROBE signal, the DSTROBE signal and the LAR signal in the control interface 7. The program counter register 8 is connected to the multiplexer 10 via lines 14. The address register 9 is connected to the multiplexer 10 via lines 13. The multiplexer 10 selects the contents of either the address register 9 or the program counter register 8 according to a signal from line 40 which is responsive to the PC or program counter control line in the control interface 7. As a result of this selection, this address is placed on lines 12 to the memory array 11. The address on line 12 designates the memory cells to be read or written via the data lines 15 which are connected to the information bus AD-0 to AD-7.

Figure 5:
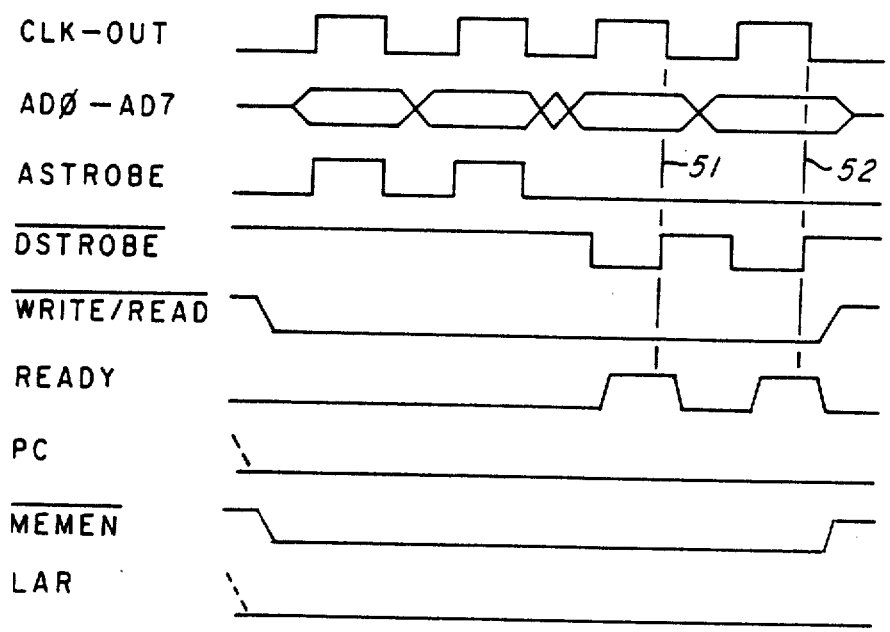
FIG. 5 is a timing diagram of a DATA WRITE to external memory.

FIG. 5 illustrates the timing of the interface to the external memory 2 for a normal write cycle. Note that the addresses are placed on the information bus AD-0 to AD-7 in the first two clock phases. During this time for each of the two clock phases, the address strobe line (ASTROBE) is high designating that the address is on the information bus AD-0 to AD-7. At the same time, the $\overline{\text{WRITE}}$/READ line is low indicating a write. The PC line is down since the processor 1 is not accessing an instruction and the memory enable ($\overline{\text{MEMEN}}$-) line is down to indicate an external memory operation. During the conventional memory access, the LAR line will also be down. After the addresses have been transmitted over the information bus AD-0 to AD-7, at the fall of the next clock cycle, the data is placed on the information bus AD-0 to AD-7. The address strobe line goes low indicating no address. However, the data strobe line (DSTROBE-) goes low indicating the availability of the data on the information bus AD-0 to AD-7. The ready line which has been in a don't care position goes high to indicate that the data has been received. If the address data has not been properly received the ready line is low and the processor would wait a clock cycle until the ready line goes high to signify the reception of the data. During the times marked by lines 51 and 52, the data may be written to the memory array 11. It should be noted that at the rising edges of DSTROBE- (53 and 54) the address register is incremented. It should also be noted that the first address of a two byte memory transfer must be on an even boundary, i.e., the least significant bit position must be one.

Figure 6:
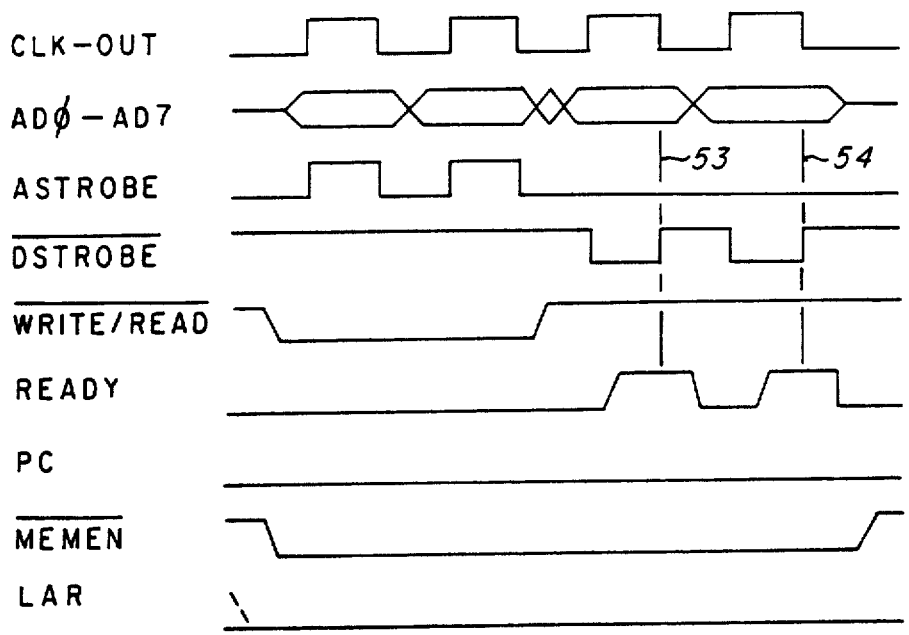
FIG. 6 is a timing diagram of a DATA READ from external memory.

FIG. 6 illustrates one of the memory read transfers. Note that in FIG. 6 the addresses are placed on the information bus Ad-0 to AD-7 and the address strobe (ASTROBE) is high during the times that the two address bytes are contained on the information bus AD-0 to AD-7. During these times also the $\overline{\text{WRITE}}$/READ line is low indicating that a write is occurring. The READY line is in a don't care state. The PC line is low indicating that a data word in memory is being accessed. The memory enable ($\overline{\text{MEMEN}}$) line is low indicating an external memory operation. During this type of operation, the LAR control line is low. At the end of the address, the data is placed on the external information bus AD-0 to AD-7 at time 53 and 54 to correspond with the rising edges of the data strobe ($\overline{\text{DSTROBE}}$) control lines as shown. The $\overline{\text{WRITE}}$/READ line is raised to signify a read operation from memory and the READY lines goes high to signify the availability of the data on the external information bus AD-0 to AD-7. It should be noted that at the rising edges of $\overline{\text{DSTROBE}}$- (53 and 54) the address register is incremented.

Figure 7:
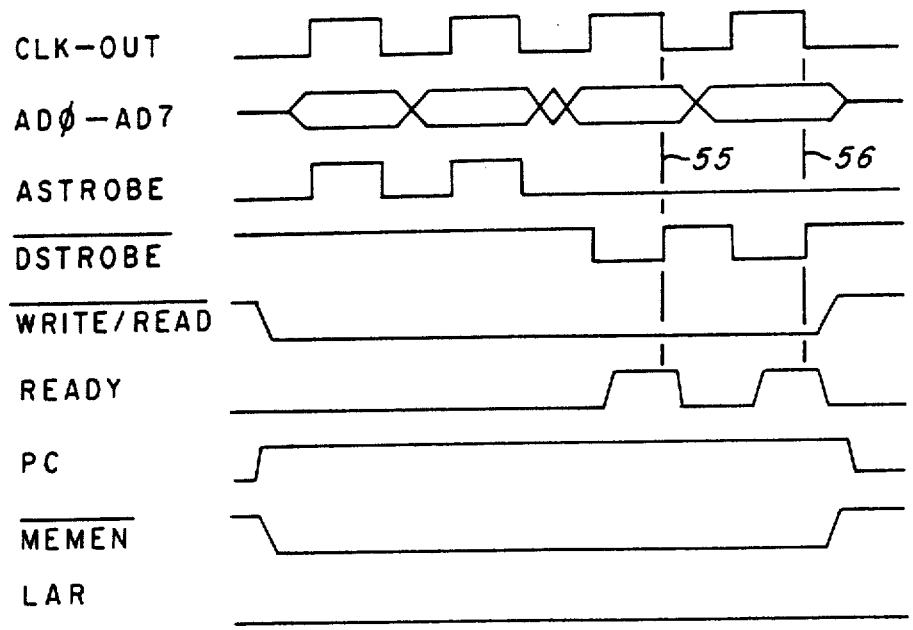
FIG. 7 is a timing diagram of an instruction WRITE to the external memory.

FIG. 7 illustrates the writing of an instruction word into memory. Note that the address bytes are placed on the AD-0 to AD-7 lines as in FIG. 5 and clocked across to the external memory during the occurrence of ASTROBE. The $\overline{\text{WRITE}}$/READ line is low indicating the write into the address registers. The READY line is in a don't care state. The PC line is high signifying that the address to be written into is written into the program counter register 8. $\overline{\text{MEMEN}}$ is low to enable a memory operation and LAR is low. After the program counter register 8 has received the two bytes of address over the AD-0 to AD-7 bus line, $\overline{\text{DSTROBE}}$ goes low to signify the presence of data to be written into memory on the AD-0 to AD-7 at times 55 and 56. Note that the $\overline{\text{WRITE}}$/READ line stays low and the READY line goes high during the time intervals 55 and 56 to indicate that the external memory has received the data. The PC line stays high to enable multiplexer 10 to provide the program counter register contents as the address for the information in memory. $\overline{\text{MEMEN}}$ and LAR remain low. During the time intervals 55 and 56, the contents of the program counter register 8 are incremented.

Figure 8:
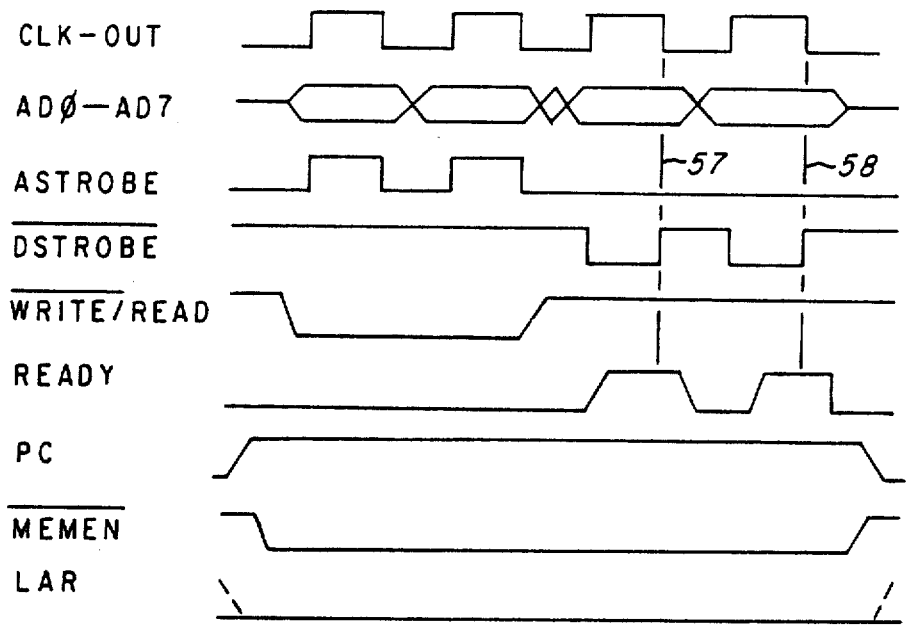
FIG. 8 is a timing diagram of an instruction READ from external memory.

FIG. 8 illustrates an instruction READ. During the first two clock cycles, the address of the instruction to be read is placed on the AD-0 to AD-7 bus on the occurrence of ASTROBE as before. Note that the $\overline{\text{WRITE}}$/READ line is low, the ready line is a don't care, the PC line is high such that the address will be placed in the program counter register 8. The $\overline{\text{MEMEN}}$ line is low. The LAR line is low. During the second portion of this cycle, the instructions are placed on the AD-0 to AD-7 line upon the occurrence of $\overline{\text{DSTROBE}}$ going low. The ready line at time intervals 57 and 58 signfy that the data on the AD-0 to AD-7 bus is valid. The PC line remains high during the information read operation. $\overline{\text{MEMEN}}$ and LAR remain low. Note as before that the program counter is incremented during the rising edges of $\overline{\text{DSTROBE}}$ at time intervals 57 and 58.

Figure 10:
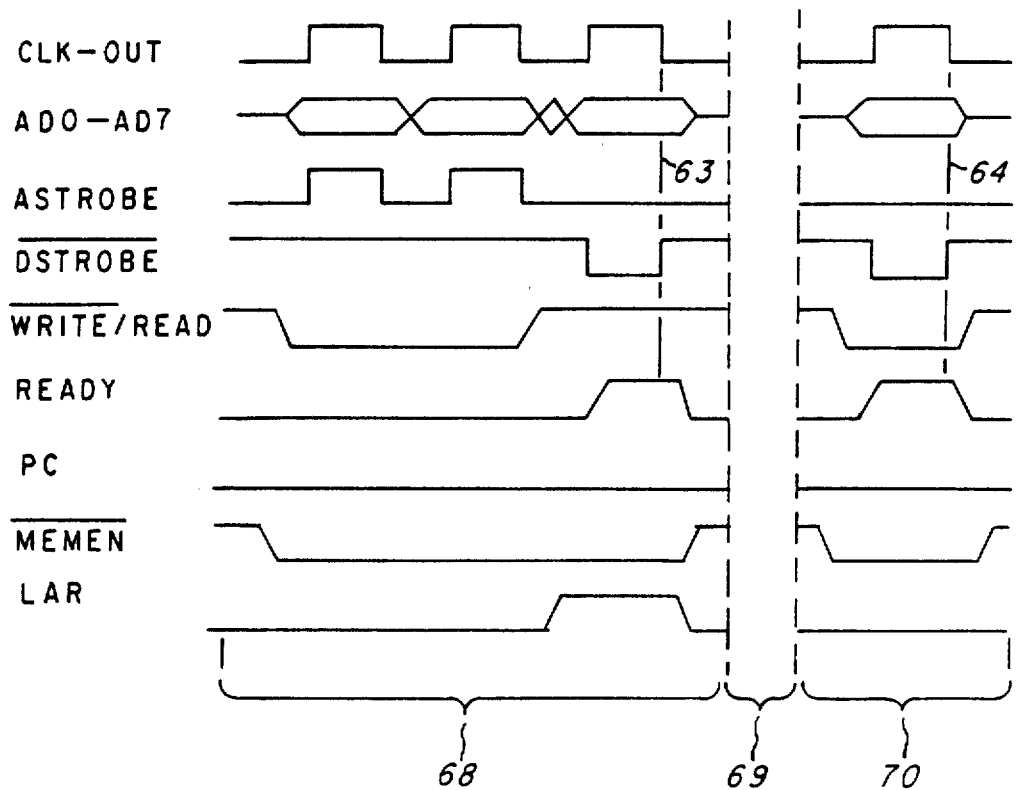
FIG. 10 is a timing diagram illustrating the addressing capability made possible by this invention for addressing individual information bytes.

The advantage of this invention is best illustrated by viewing FIGS. 9 and 10 together with FIG. 11. During an instruction execution cycle in the processor, data is read from the memory array 11 using the source operand address and the destination operand address. The processor then performs a operation on the data and stores the result in the location specified by the destination operand address. It is important to note that the destination operand address does not change from the time when the data is fetched to the time that the data is stored. However, under normal sequencing of the quadmultiplex information bus, the contents of the address register 9 is incremented or the occurrence of $\overline{\text{DSTROBE}}$. By returning the contents of the address register 9 to its original state, the information resulting from the execution of the instruction in the microprocessor is stored into memory without having to rewrite the destination operand address. FIG. 9 illustrates the reading and writting that occurs for the destination operand. When the destination operand is read for the first time, the address of the destination operand are placed on AD-0 to Ad-7 during the two address ASTROBE pulses as shown in FIG. 9. At this time, the write/read line is low indicating a write into the address register, the ready line is in the don't care state, the PC line is low, indicating that the address register 9 is being written into, the memory enable $\overline{\text{MEMEN}}$ line and LAR lines are low. During time intervals, 59 and 60, the contents of the destination operand address is placed on the AD-0 to AD-7 bus as indicated. Note that the data strobe $\overline{\text{DSTROBE}}$ lines go low as a request for the data on the bus and the ready line goes high for the time that each byte of data is placed on the bus. Note also at this time that the LAR load address register line is high. The destination operand read timing interval is signified by the time interval 65 in FIG. 9. The time interval 66 indicates the time for the processor to perform the function on the source operand and the destination operand as previously discussed. During time interval 67, the processor will write the results into the memory location designated by the destination operand address. At that time, the LAR line is low which places the original destination operand address in the address register 9. Therefore, only the data has to be sent across the AD-0 to AD-7 bus since the address already exists in the address register. This data is sent across at the time interval 61 and 62 as indicated. Note that the DSTROBE lines at 61 and 62 do cause the contents of the address register 9 to be incremented correctly for the proper storage of the data bytes on the AD-0 to AD-7 bus. Note also that the write operation is signified by the ($\overline{\text{WRITE/READ}}$) line and ready line. The PC remains low, the $\overline{\text{MEMEN}}$ line remains low indicating the memory operation.

FIG. 10 illustrates the same operation, except for byte operations. Note that in the interval 63 only one byte of information is transferred across the AD-0 to AD-7 bus to the processor and at time 64 only one byte of information is written into memory. The invention is still required because at time interval 63 the rising edge of the $\overline{\text{DSTROBE}}$ line will cause the contents of the address register 9 to be incremented. However, when the data is to be stored in the memory location designated by the destination operand address, the contents of the address 9 must be decremented. Therefore, during time interval 68, the LAR line is high during the reading of the data. The processor is processing the source operand and destination operand during the time interval indicated by 69 and storing the byte data during the time interval 70. However, during the time interval 70 the address for the destination operand is placed into the address register by effectively decrementing this address register.

Therefore the object of the invention is to allow for the original address of the destination operand to be automatically placed into the address register 9 after incrementing has taken place for either the reading of a byte or the reading of two bytes. This is accomplished by the circuitry illustrated in FIG. 11. FIG. 11 illustrates the contents of address register 9. Note that the lines 13 are the 16 bit address that are inputted into memory array 11 to access memory locations. The inputs from the AD-0 to AD-7 bus occur on lines 16 into a buffer register 84 which is controlled by line 90. Line 90 represents occurrence of the ASTROBE. Upon the first occurrence of ASTROBE, the demultiplexer 84 loads the first byte (or 8 bits) into the most significant 8 bit positions of the register 86. Upon the second occurrence of ASTROBE, the byte contained on line 16 is loaded into the lowest significant 8 bit positions of buffer register 86 by the demultiplexer 84. Note that the least significant bit of register 86 and the least significant bit of flip-flop 85 are connected to a multiplexer 87 which is switched by line 39-2 and results in the least significant bit being placed on the lines 13 to the memory array 11. Register 86 is connected to line 89 and flip-flop 85 is connected to line 75. Lines 89 and 75 are connected to the two NAND gates 72, 73 and inverter 74 which in turn receive inputs from 39-1 and 39-2. Line 39-1 is high upon the occurrence of the rising edge of $\overline{\text{DSTROBE}}$. Line 39-2 is the LAR signal. During the normal operation of a memory read or memory write, the contents of register 86, bits 15 through 0, are read onto line 13. In other words, the least significant two bits (bit 1 and bit 0) of register 86 are read through the multiplexer 87 onto lines 13. Therefore, when LAR is low the two least significant bits in 86 are read through the multiplexer 87. Upon the occurrence of $\overline{\text{DSTROBE}}$ on line 39-1 when LAR is low, NAND gate 73 produces an output on line 89 which increments the contents of register 86. This allows the register to read successive bits of memory onto the AD-0 to AD-7 bus by just the occurrence of the $\overline{\text{DSTROBE}}$ signal. However, in a situation when the destination operand is first read and then later written into memory, the contents of the address register must return to the original destination operand address. During a memory read or memory write, or memory write such as in FIG. 9 or FIG. 10, the LAR line is high during the DSTROBE sequence. When the $\overline{\text{DSTROBE}}$ is raised and the LAR line is high, $\overline{\text{DSTROBE}}$ does not increment the contents of register 86 via line 89, but rather through NAND gate 72 line 75 goes high which toggles the flip-flop 85. Also during this time, multiplexer 78 is switched by line 39-2 to feed the contents of register 85 into the least significant two bits of lines 13. This allows the least significant bit of the address register to actually be incremented in relation to the memory array 11 while maintaining the original destination address in register 86.

It should be obvious to one skilled in the art that flip-flop 85 could be replaced by a 16 bit register in order to allow for address incrementing of addreses on odd boundaries. This type of architecture would result in redundancy of address registers where one address register would be used for incrementing and the second for storage.

What is claimed is:

1. A digital processor system comprising:
   processor means for processing of data according to program instructions; memory means including a memory array means for storing according to memory addresses, the data and program instructions:
   Interface means coupled between said processor means and said memory means for transferring the data and programmed instructions, said interface means comprising:
   control means responsive to said processor means and said memory means for providing control signals in response to the processor means and said memory means;
   a quadruply extended time multiplex information bus means having a first preselected number of bits in width for transferring data and program instructions having a second preselected number of bits in width greater that the first preselected number of bits between said processor means and said memory means;
   memory addressing means coupled to said quadruply extended time multiplex information bus for receiving memory address and the data and programs instructions and includes;

a first register means for providing memory address of the data to the memory array means, a second register means for providing memory addresses of the program instructions to the memory array means, boththe first and second register means being coupled to said control means and in response to the control signals alter the contents of said first and second register means by incrementing or decrementing the register contents of the first register means, switch means for connecting either the first or second register means to the memory array means in response to a preselected member of the control signals to store the data and program instructions in the memory array means thereby.

2. A digital processor system according to claim 1, wherein said control signals include an address strobe signal, data strobe signal and a program counter signal coupled to said switch means to allow either the memory address stored in said first register means or in said second register means to be coupled to said memory means.

3. A digital processor system according to claim 2, wherein said first register of said memory addressing means may be incremented upon occurrence of the data strobe signal.

4. A digital processor system according to claim 2, wherein said control signals further include a read/write signal and a memory enable signal from said processor means and a ready signal from said memory means.

5. A digital processor system according to claim 1, wherein said control signals include a load address signal coupled to said first register to provide decrementing capability.

* * * * *